Dec. 2, 1941. W. E. KNAPP ET AL 2,264,575
HYDRAULIC LIFT MECHANISM
Filed Nov. 17, 1939 6 Sheets-Sheet 2
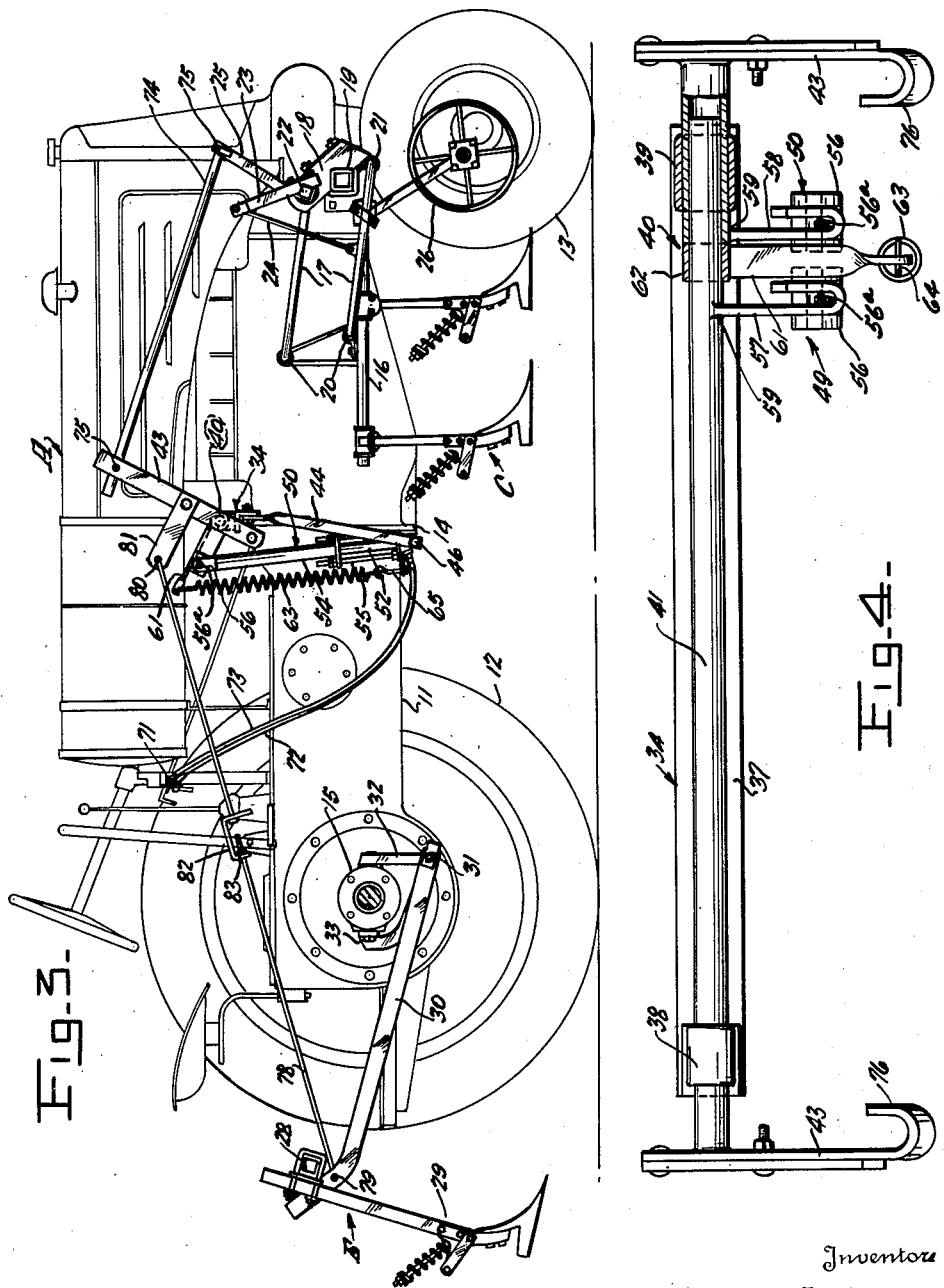
Inventors
WILLIAM E. KNAPP
PAUL C. SEAHOLM
By Carlsen + Hazle
Attorneys

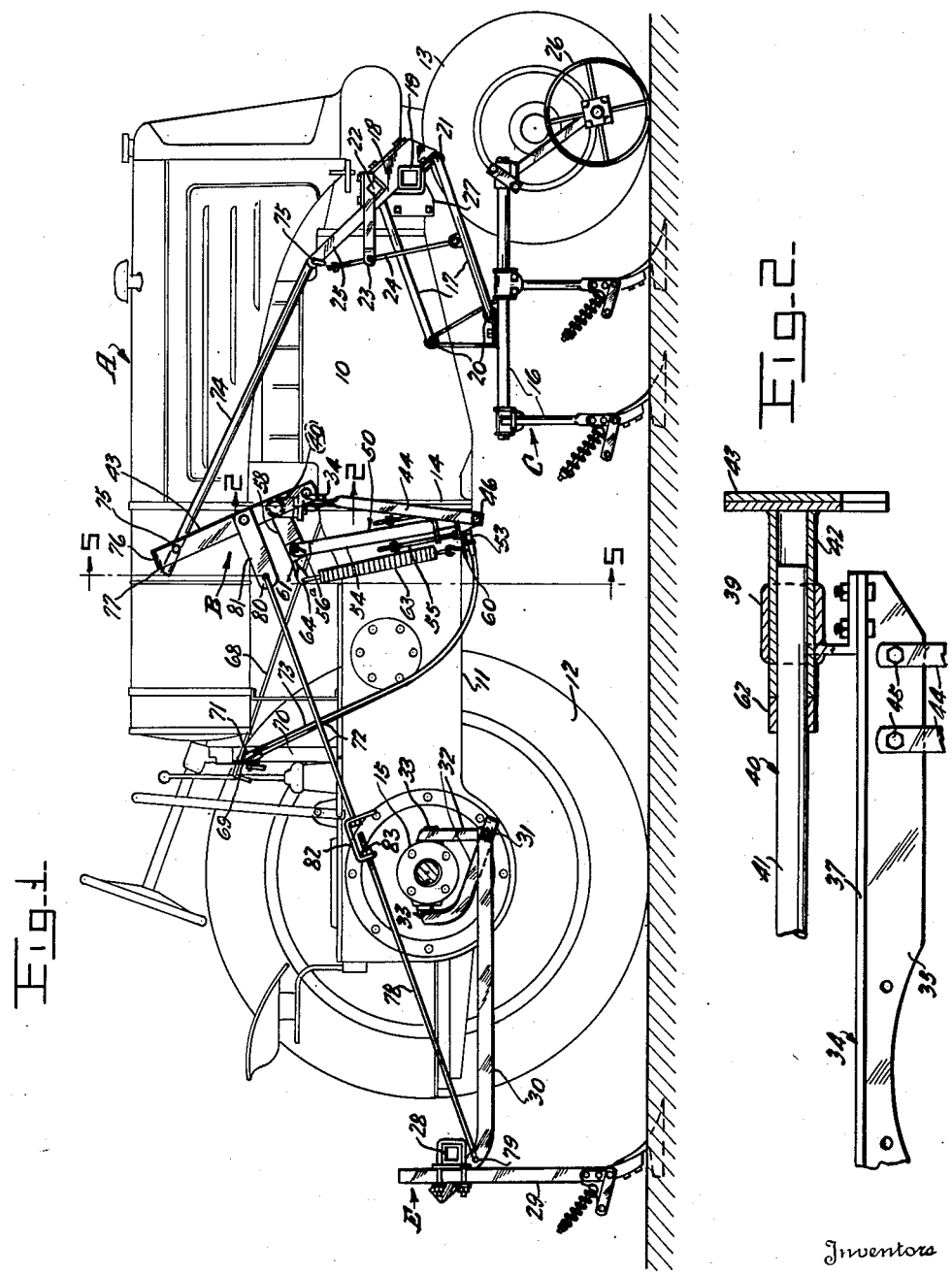

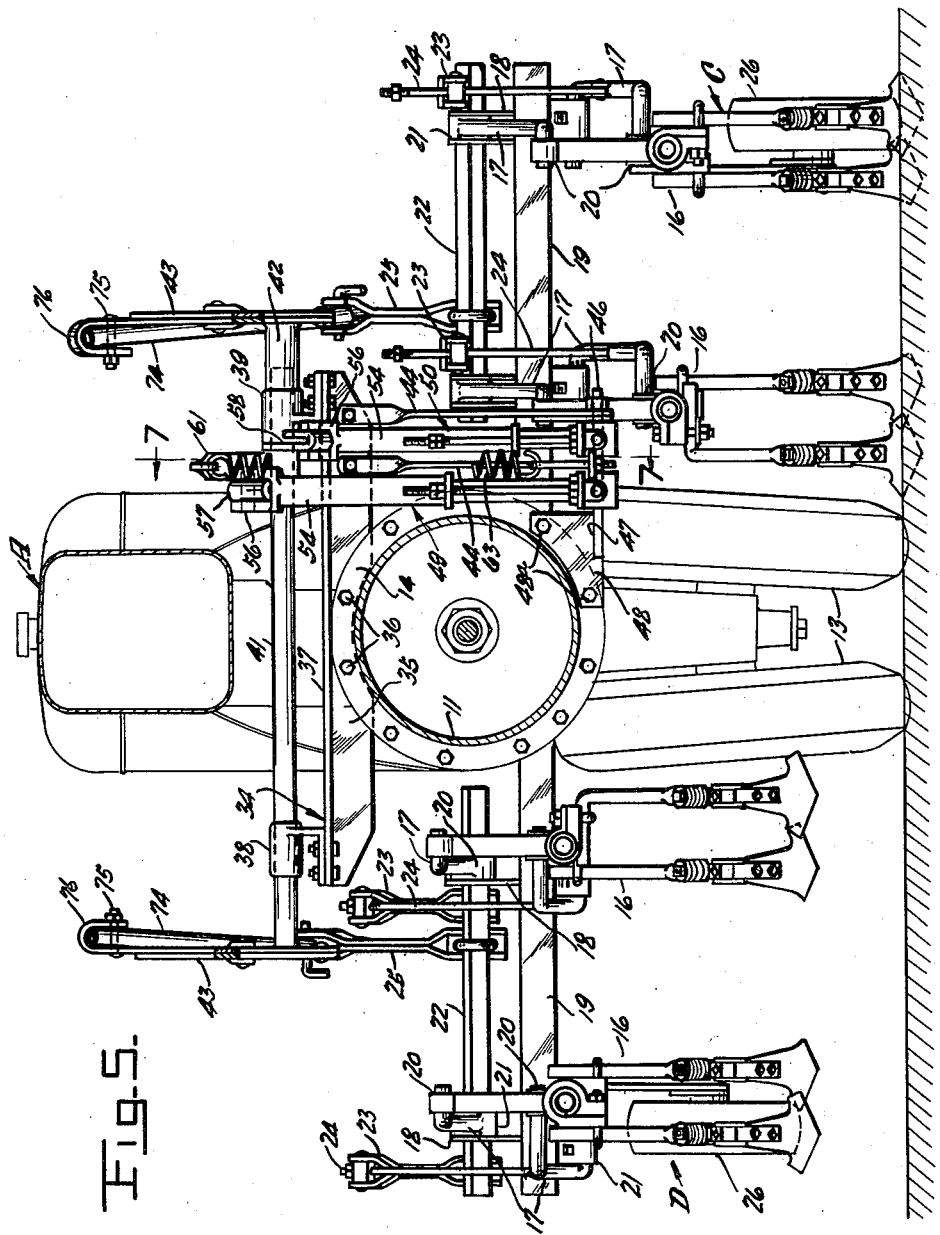

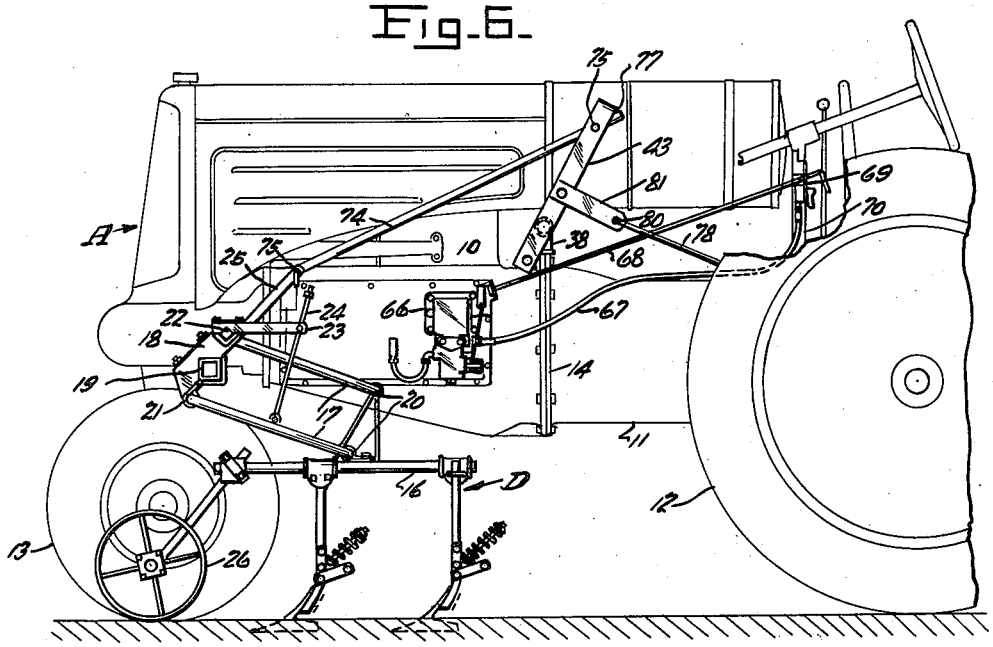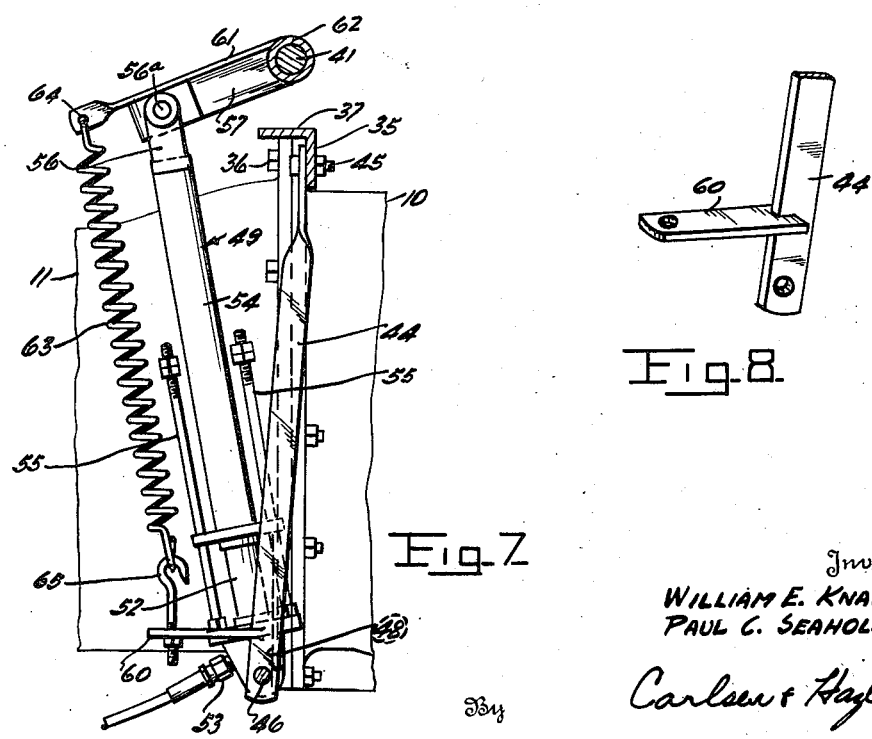

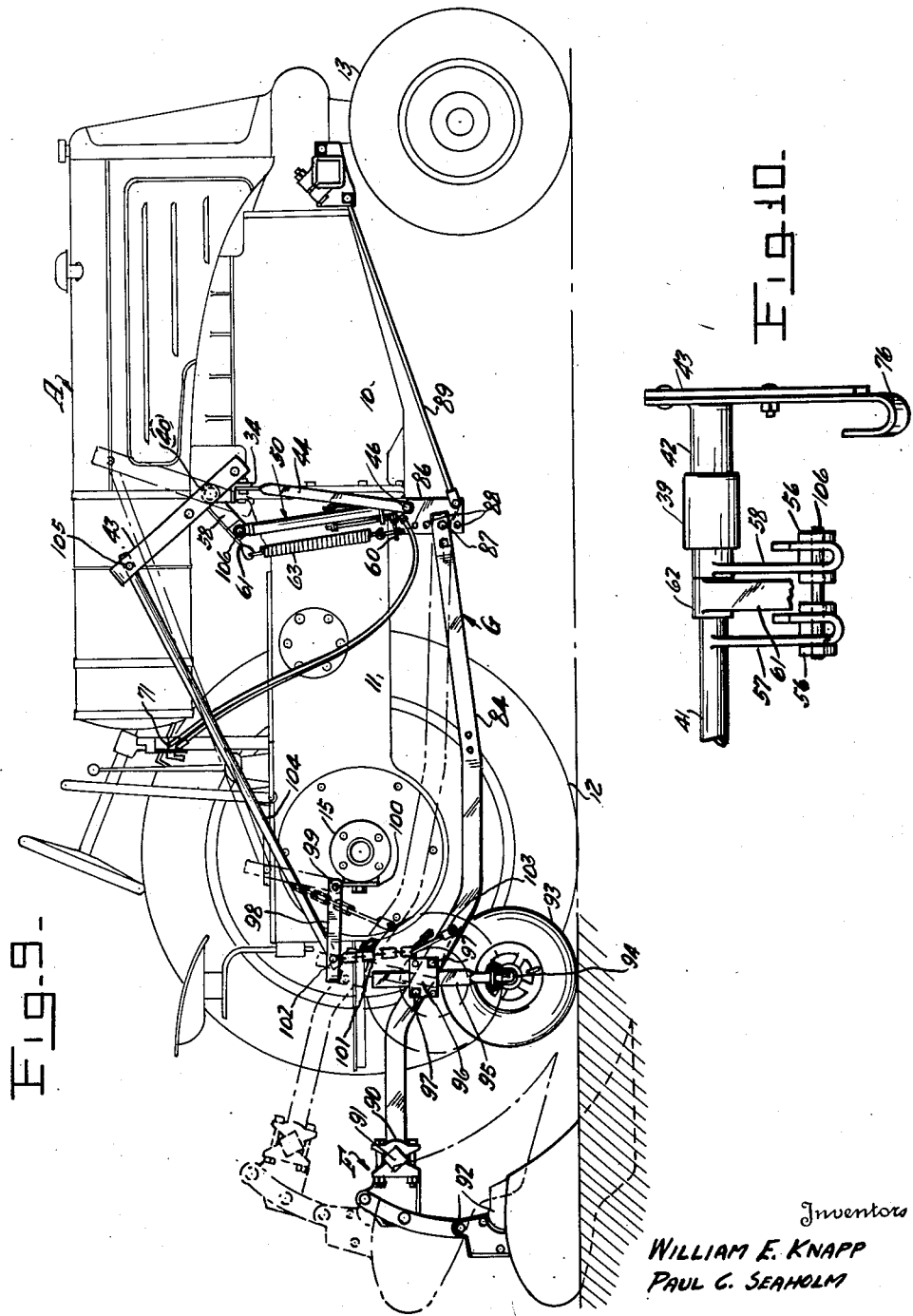

Dec. 2, 1941.  W. E. KNAPP ET AL  2,264,575
HYDRAULIC LIFT MECHANISM
Filed Nov. 17, 1939  6 Sheets-Sheet 6

Inventors
WILLIAM E. KNAPP
PAUL C. SEAHOLM

By Carlsen + Hazle
Attorneys

Patented Dec. 2, 1941

2,264,575

UNITED STATES PATENT OFFICE 2,264,575

HYDRAULIC LIFT MECHANISM

William E. Knapp and Paul C. Seaholm, Moline, Ill., assignors to Minneapolis-Moline Power Implement Company, Minneapolis, Minn., a corporation of Delaware Application November 17, 1939, Serial No. 304,930

13 Claims. (Cl. 97—50)

This invention relates to power lift devices for tractor attached implements.

The primary object of the invention is to provide a hydraulically operated lifting mechanism for raising implements at front or rear of the tractor, or both, and at either side thereof, and also for adjusting the working depth of such implements.

Another and important object is to provide a device of this nature which may be used to raise or adjust implements at either side of the tractor independently of the other to thus facilitate the cultivating or working of crop rows in irregular fields or in contour forming operations.

Another object is to provide a power lift mechanism employing dual lift cylinders to which hydraulic fluid under pressure may be admitted either singly or together, and which cylinders are independently connected to implements on opposite sides or sections of the tractor to thus provide for independent or simultaneous control of such implements by proper fluid admission to the lift cylinders.

A further object is to provide, in a structure as above described, a spring equalizing device arranged to equalize the load between the lift cylinders as they are operated and to further provide for a quick drop of the implements as they are lowered to working positions.

Still another object is to provide a means whereby said dual lift cylinders may be readily connected together to operate as a single unit where all implements are to be raised together, or to provide additional power for raising a heavy implement arranged for instance at the rear of the tractor.

These and other more detailed and specific objects will be disclosed in the course of the following specification, reference being had to the accompanying drawings, in which—

Fig. 1 is a side view of a tractor equipped with cultivator implements (shown in working positions) at front and rear and with our improved power lift mechanism connected thereto, the near traction wheel of the tractor being removed.

Fig. 2 is an enlarged fragmentary transverse section along the line 2—2 in Fig. 1, showing portions of the rock shaft structure and associated parts.

Fig. 3 is a view similar to Fig. 1, but showing the front and rear implements raised to transport positions.

Fig. 4 is an enlarged plan view, partially in section, of the complete rockshaft structure, mounting bracket, and associated parts of the lifting mechanism.

Fig. 5 is an enlarged transverse vertical section taken along the line 5—5 in Fig. 1, and showing one of the forward implements in working position and the other in transport position.

Fig. 6 is a left hand side elevation of the frontal portion of the tractor showing the forward implement in working position and illustrating one type of pump used for supplying the necessary hydraulic fluid for actuating the lift cylinders.

Fig. 7 is an enlarged longitudinal and vertical section along the line 7—7 in Fig. 5.

Fig. 8 is a fragmentary perspective view of the mounting bracket for the load equalizing spring as shown in Fig. 7.

Fig. 9 is a side elevation of a tractor and a different type of implement, the power lift mechanism being shown connected thereto and the implement being also shown in transport position by dot-dash lines.

Fig. 10 is a fragmentary plan view of the rock shaft and upper ends of the lifting cylinders, showing the connection between these parts by which the cylinders are caused to act as a unit in an installation such as in Fig. 9.

Figure 11:
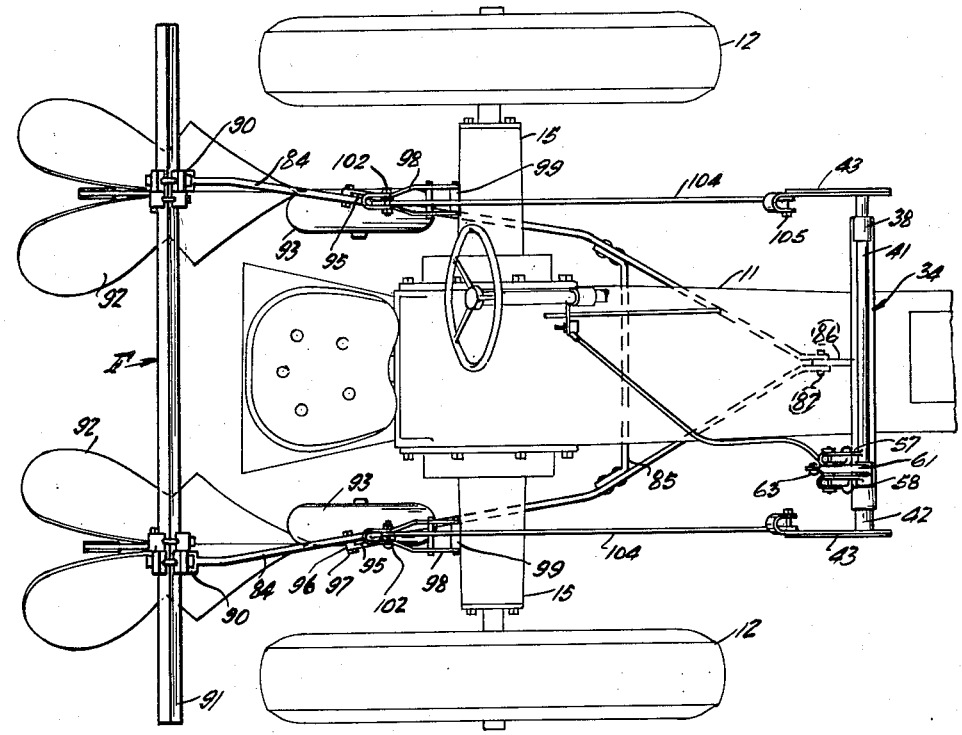
Fig. 11 is a plan view of the rear portion of the assembly of Fig. 9.

Referring now with more particularity to the drawings, a conventional form of tractor is designated at A and includes the power unit 10 having the rearwardly extending housing 11 supported rearwardly by large traction wheels 12 and forwardly by the steerable, close-spaced front wheels 13. The housing 11 is secured to the power unit 10 by the circular, diametrically enlarged flange 14, and the traction wheels 12 are supported at the ends of the rear axle housings 15.

The power lift mechanism, designated generally at B, as disclosed in Figs. 1 through 8 of the drawings, is designed to lift and control the two forward implements C and D, which are mounted at opposite forward sides of the tractor, and the single rear implement E mounted behind the tractor, these implements being shown for example as cultivators.

The forward implements C and D are identical in construction and comprise the conventional shovel gangs 16 which are connected by parallel links or bars 17 to mounting members 18 adjustably arranged, for transverse row spacing adjustments, on the front beams or tool bars 19. The links are pivotally connected as at 20 to the gangs and at 21 to the members 18, and to transverse square shafts 22 journaled through said members. Arms 23 are adjustably secured to said shafts 22 and are connected by lost-motion lifting rods 24 to the lower links so that rocking of the shafts 22 on their axes, by means of levers 25 secured thereto, will raise or lower the gangs. The parallel lever action of the links 17 holds the gangs level at all times to secure even penetration of front and rear tools. Gauge wheels 26 govern the penetration within the "floating" range of the gangs in usual manner. The tool bars 19 are removably mounted in laterally extended positions by brackets or clamps 27 secured to opposite frontal sides of the tractor.

The rear implement E, also of conventional form, comprises a transverse tool bar 28 on which the shovels 29 are adjustably mounted, and this bar is secured at the rear ends of transversely spaced, longitudinal drag bars 30 pivotally connected at 31 to bracket arms 32. Said bracket arms are secured at 33 to the rear axle housings 15 in the manner shown.

The power lift mechanism B comprises a mounting bar or bracket member 34 which is secured transversely to the tractor to extend at opposite sides therefrom at a position between the front and rear implements C, D, and E. As here disclosed, this bracket takes the form of a length of angle iron, having one flange 35 turned vertically and bolted at 36 to the flanges 14 joining the power unit 10 and transmission housing 11 of the tractor, and having its other flange 37 turned horizontally as shown.

Bearings 38—39 are secured atop this flange 37 near the outer ends of the bracket, and the lifting shaft or rock shaft assembly 40 is journaled transversely in these bearings. Said assembly comprises a shaft 41 and sleeve 42 telescopically arranged so that said shaft extends to one side through one bearing and the sleeve extends to the other side through the other bearing. The shaft and sleeve thus may be oscillated freely on the same axis either independently of each other or as a unit, as may be required. Lifting levers 43 are secured rigidly to the opposite ends of the shaft 41 and sleeve 42 and are so located and aligned with the front and rear implements C, D, and E that they may be readily connected thereto as will be hereinafter detailed.

Hanger arms 44 are secured in spaced, depending relation to an outer end portion of the bracket 34 by means of bolts 45, and at their lower ends these arms are apertured to receive a mounting pin 46 which is extended in a horizontal and transverse direction therethrough. The inner end of said pin is welded or secured at 47 to a plate 48 which is bolted at 48a to the tractor, conveniently upon the flanges 14, to make the assembly rigid. A pair of lift units, pressure responsive units or jacks 49—50 are provided and at their lower ends are pivoted upon the pin 46 so that the jacks will extend upwardly toward, and rearwardly of, the lifting shaft assembly 40. These lift units or jacks are of the type shown and described in detail in the copending application of Victor N. Albertson, Serial No. 278,476, for Power lift, filed June 10, 1939, to which reference may be had for comparative purposes. It is sufficient herein to state that the units comprise the lower cylinder portions 52 to which fluid may be admitted through couplings 53 to urge the upper plunger portions 54 upwardly until their movement is limited and stopped by the adjustable guide rods or bolts 55. The upper ends of the plungers are forked to form clevises 56 by which they may be pivotally attached, by short pins 56a, to the outer or rear ends of rockshaft arms 57 and 58. Said arms 57 and 58 are, respectively, rigidly secured at 59 to, and rearwardly turned from, the inner end of the aforesaid sleeve 42 and an adjacent portion of the shaft 41 and the entire assembly is, as clearly shown, made to bring the inner and outer lift units or jacks 49—50 into vertical, side by side relation close alongside the tractor transmission housing 11.

One hanger arm 44 is disposed between the jacks 49—50 and from this arm is rigidly and rearwardly extended a spring mounting finger or lug 60. A load equalizing lever or arm 61 is freely journaled by a collar-like end 62 upon the rockshaft 41 between the arms 57 and 58 and extends rearwardly over said arms to terminate in an apertured end to which a large retractile coil spring 63 is hooked at 64. The lower end of this spring is connected to an eye bolt 65 adjustably mounted through said lug 60. The width of the arm 61 is such that it will easily clear the paths of the arms 57 and 58 but will be engaged by either or both of the clevises 56 as the lift plungers move upwardly.

The lift units 49—50 are supplied with a hydraulic fluid under high pressure by any suitable pump means such as indicated at 66 in Fig. 6. This pump also is shown and described in detail in the copending Power lift application hereinbefore identified, and is actuated by the engine to take oil from the engine lubricating system and discharge it under pressure to the supply line 67. The pump is controlled by a rod 68 extended rearwardly to a dial plate 69 secured to the steering shaft standard 70 of the tractor. For controlling the admission of fluid to the two lift units 49—50 a conventional form of three-way valve 71 is provided and same may conveniently be secured to said plate 69 for manipulation by the driver of the tractor. Separate supply lines or tubes 72—73 run from this valve 71 to the inlet couplings 53 of the two jacks 49—50, and it will be understood that, by proper manipulation of the valve, the fluid may be admitted selectively to either or both of the cylinders 52 to any desired amount, and may be allowed to escape back therefrom as required.

Operative connections to the forward implements C and D are made by push rods or tubes 74 which extend between the upper ends of the levers 43 and 25 and are pivotally connected thereto at 75. The levers 43 have U-shaped upper ends as designated at 76 and the rods 74 are extended through the cleft of these ends of the rods beyond the rear pivot connection 75, will engage the upper, turned ends of the levers 25 as shown at 77 in Fig. 1. This engagement comes at a position in which it will limit the rearward and downward movement of the lifting levers 25 so that they cannot reach a dead center condition with respect to the push rods 74 and thus prevent opposite, lifting movement of the parts.

For connection to the rear implement E, pull rods 78 are used at each side and are pivotally connected at 79 near the rear ends of the drag bars 30, extended forwardly and upwardly over the rear axle housings 15 and pivotally connected at 80 to short arms 81 secured rigidly to the lifting levers in a rearwardly extended position above the rockshaft connections of said levers. The pull rods 78 are each formed in two parts or sections as shown, and these sections are adjustably connected at adjacent ends to U-shaped yokes 82. One section of each rod is provided with a threaded end and nut 83 by means of which the effective length of the rods as a whole may be varied to thus regulate the penetration of the rear implement at any reference lowered position of the lifting mechanism. Said yoke connection between the sections of the pull rods 78 further permits the play necessary for a desirable floating action of the rear implement, as will be understood.

In operation the various parts are of course proportioned and designed so that, in the lowered position shown in Fig. 1, the implements will assume the proper operative position with respect to the ground and crop. To lift all of the implements C, D, and E, then, the operator manipulates the valve 71 to the position in which fluid is admitted equally to both lift units 49—50 to the desired amount. The plungers 54 thus are moved upwardly, swinging the arms 57 and 58 and rocking both the shaft 41 and sleeve 42 in the bearings 38 and 39. The lifting levers 43 now move forwardly at their upper ends and by pushing action of the push rods 74 oscillate the shafts 22, and through lifting action of the arms 23 on the rods 24 lift the front implement gangs 16. The action of the levers 43 simultaneously, through the pull on the rods 78, swings the drag bars 30 upwardly at their rear ends, drawing the rear implement tools 29 upwardly. The lifting action of front and rear implements is coordinated by the provision of the short arms 81 on the lifting levers 43 to the point that all implements will be adjusted through a proper relative degree or range.

The rate and extent of the foregoing lifting action may be regulated, by proper manipulation of the valve 71, to either move the implements through a minor range for depth and penetration adjustments or to lift them fully to transport positions, as shown in Fig. 3. The implements may of course be lowered by opening the valve 71 to allow the fluid to escape from the jacks, and the reverse of the foregoing action will take place at this time. The upward movement of the jack plungers 54 in the lifting operation is yieldably resisted by the spring 63 as it is stretched by contact of the plunger clevises 56 with the arm 61. The spring thus serves to speed the drop of the implements when the fluid is allowed to escape from the jacks, as well as serving other functions as will appear.

The two forward implements C and D may also be raised or lowered independently of each other inasmuch as they are independently connected to the shaft 41 and sleeve 42. For this operation the valve 71 is manipulated to admit the fluid to either of the lift units 49 and 50 whereupon the upward movement of the single plunger 54 will oscillate either the shaft 41 or sleeve 42 and cause an upward movement of the attached implement. For example, the left hand implement D is shown as raised alone (to transport position) in Fig. 5.

The latter action is of particular advantage in cultivating row crops where, through irregular field outline or the practice of contour forming, the rows run out to "points" at certain places. When working near the ends of such rows it is desirable, and in fact necessary, to raise the implements on the side where the row has ended and continue for a short time cultivating the pointed row on the other side. For this purpose the valve 71 is manipulated to admit the oil to one cylinder first so that the implement on one side raises ahead of the other. As the degree or angle of "row point" will vary greatly, no fixed time or interval can be set for the differential in the raising of the gangs. As an average, in actual operation, it will be found that the tractor will travel about ten feet during the time the implement is being fully lifted, and therefore on a row with a five foot point one gang may be partially lifted when the other is just starting to lift. There are of course other situations in which it will be desirable to lift either gang either slightly or completely, independently of the other gang, and such operation may be readily carried out by this invention, as will be understood.

In this operation the spring 63 performs an important and novel function. It will be readily understood that, without any means of equalizing the load on the respective lift units, the implement which is in partially lifted position would continue to fully lifted position when the valve is shifted to admit fluid to both jacks at the same time, this of course being due to the partially lifted implement presenting considerably less resistance than the implement still working at full depth in the ground. However, the spring arm 61, lying as it does in the path of the clevises 56, is engaged and lifted as either lift unit is operated and thus the spring presents a resistance to lifting greater than that of the still working implement. As a result, when fluid is admitted to both jacks, the partially lifted implement will remain so, or in effect "wait" until the other implement reaches the same level, whereupon the load pressure will be equalized as both jacks work against the resistance of the spring and further lifting of the implements will be at exactly the same rate. It is thus possible to independently adjust either forward implement to a desired level and then raise the other to the same position without lag or loss of control at any time.

The rear implement E will of course be lifted to some extent as either frontal implement is lifted, but this is not a serious objection since the rear implement tools 29 are primarily used only to loosen the earth packed down by the tractor wheels.

Figure 12:
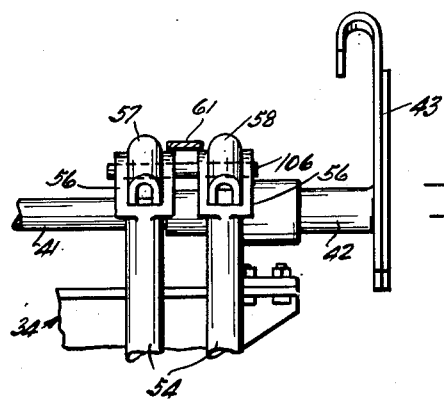
Fig. 12 is a fragmentary rear elevation of the structure shown in Fig. 10 to further illustrate the connection between the lift cylinders.

In addition to the foregoing assembly for use in connection with both front and rear tractor connected implements, the power lift mechanism may also be used with larger, tillage and planting implements at the rear of the tractor. Such an assembly is shown in Figs. 9 through 12.

The tractor A and power lift mechanism B are essentially identically the same as heretofore described, and the various parts are accordingly referred to by the same reference characters. However, this type of implement designated at F is connected by a heavy duty attachor structure G to the underside of the tractor. The structure G comprises heavy, forwardly converging drag bars or drag frames 84, transversely braced at 85, and extended beneath the axle housings 15 to a point beneath the junction of the engine 10 and transmission housing 11. A hitch plate 86 is secured to the underside of the tractor at this point and the drag bars 84 are pivotally connected thereto by a horizontally and transversely axised pin 87, a vertically spaced series of holes 88 being provided in said plate for receiving the pin 87 to permit adjustment of the draft line. The hitch plate 86 is braced by forwardly secured brace rods 89.

The divergent rear ends of the drag bars 84 have clamps 90 for the releasable attachment of a transverse tool bar 91 to which may be secured any desired kinds or types of tools, as for instance the plows 92. The drag bars are angularly formed, as shown in Fig. 9, to give sufficient clearance beneath the rear axle housings 15 to permit lifting of the implement as will appear.

Gauge wheels 93 are provided and have their axles 94 turned upwardly in the form of tangs or shanks 95 which are secured by clamps or clamp plates 96 and bolts 97 to the drag bars 84 forwardly of the tools. The shanks 95 may be adjusted vertically in said clamps 96 to thus enable the wheels to gauge and regulate the penetration of the tools to any desired depth, as will be readily apparent.

For lifting an implement structure such as described, lifting arms or yokes 98 are pivotally mounted at 99 to plates 100 secured on the rear axle housings as shown, and these arms are arranged to normally extend rearwardly above the drag bars 84 where these bars pass rearwardly from beneath said axles. Lifting chains 101 are connected to cross pins 102 in the rear end portions of the arms 98 and are adjustably connected by clevises 103 to the drag bars, these chains providing the necessary play for the floating action of the implement as the gauge wheels 93 roll over the field. Pull rods or bars 104 are pivotally connected to said pins 102 at their rear ends and extend forwardly to points of pivotal connection at 105 with the upper ends of the lifting arms.

This completes the power lift connections to the implement F, and it will be readily evident that forwardly rocking or swinging movement of the lifting arms 43, under force exerted by the lift units 49—50 as heretofore described, will exert a pull on the rods 104 to swing the arms 98 upwardly and lift the bars 84 through the chains 101. This action will of course lift the implement F to the desired amount.

In this installation independent operation of the jacks 49—50 is not required, and the short pins 56a are accordingly removed from the clevises 56 and replaced by a single long pin 106 which connects both jacks to both of the arms 57 and 58. As a result both lift units operate as a single unit to provide a maximum lifting force for the implement, and it is thus unnecessary to replace or otherwise disturb the lift units when changing from one type of implement to another.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. The combination with a tractor including a motor and adapted to carry at least two implement units, two power lift devices mounted on the tractor and adapted to derive power from the motor, means for connecting the power lift devices to the respective implement units to raise and lower the same, means for selectively operating the power lift devices so as to selectively adjust the implement units, and means for locking the power lift devices with respect to each other so that they may only be operated simultaneously.

2. In combination with a tractor, a pair of implements carried at the front of the tractor and mounted thereon for independent vertical adjustment, an implement mounted for vertical adjustment at the rear of the tractor, a pair of independently operable power lift units mounted on the tractor and respectively connected with the pair of implements to selectively adjust the same, and means, operative upon lifting either of said front implements through its lift unit, to lift the implement at the rear of the tractor.

3. Power lift mechanism for a tractor having an implement mounted thereon, comprising a pair of piston and cylinder units mounted on the tractor and adapted to be operated by fluid pressure developed by the motor of the tractor, crank arms mounted on the tractor for actuation by said piston and cylinder units, connections between the crank arms and implement, means for controlling fluid pressure to the piston and cylinder units whereby the crank arms may be selectively or simultaneously energized, and means engageable with said crank arms to resist movement of either or both when the same are selectively or simultaneously energized.

4. Power lift mechanism for a tractor having an implement mounted thereon, comprising a pair of fluid pressure responsive jacks both mounted on one side of the tractor, a pair of lift arms mounted at opposite sides of the tractor, connections between the arms and implements, and connections between the arms and the respective jacks.

5. Power lift mechanism for a combination tractor-implement comprising a pair of fluid pressure responsive piston-cylinder jacks fulcrumed at their lower ends on the tractor and extending upwardly from such fulcrums, a pair of cranks mounted on the tractor for connection with an implement to adjust the same, arms connected with the respective cranks and with the respective upper ends of the jacks, and means for selectively connecting said arms in a manner causing them to move in unison under the pressure influence of both jacks.

6. Power lift mechanism for a tractor comprising a pair of cylinder-piston jacks mounted at their lower ends on the tractor and extending upwardly, a pair of lift devices mounted on the tractor adjacent said jacks, said devices each having a crank for connection with an implement to lift the same, and each having an arm connected with the upper end of a jack for operation thereby, means for selectively operating said jacks, and spring means tending to resist the jack actuated movements of said arms.

7. In combination with a tractor having two tools mounted thereon, a pair of fluid pressure responsive jacks mounted on the tractor, operating connections between the jacks and respective tools, means for selectively controlling the jacks to thereby adjust the respective tools as desired, and yieldable means resisting the jack operated movement of one tool in advance of the other.

8. Power lift mechanism for a tractor comprising a pair of lift levers fulcrumed on the tractor one at each side thereof and at points substantially midway between the fore and aft ends of the tractor, a cylinder-piston assembly mounted on the side of the tractor adjacent one of said lift levers, and connections between the lift levers and the said assembly whereby the latter may operate the lift levers selectively or simultaneously as desired.

9. Power lift mechanism for a tractor having gangs of tools mounted thereon, comprising a pair of fluid pressure responsive, extensible units, mounted on the tractor, connections between said units and the respective tool gangs, said connections including a pair of correspondingly movable adjacent members, and a spring actuated restraining element engageable with said adjacent members.

10. In combination, a tractor, vertically adjustable implement gangs connected to the front thereof, one at each side of the center, an implement frame pivotally secured to the rear of the tractor for vertical adjustment, a pair of levers fulcrumed on the tractor one at each side thereof, lift connections between the levers and the respective implement gangs at the front of the tractor, lift connections between both of said levers and the implement frame at the rear of the tractor, and fluid pressure responsive jack means for selectively or simultaneously operating said levers whereby the gangs may be selectively lifted or lowered.

11. In combination with a tractor, two vertically adjustable implements mounted thereon, power lift mechanism mounted on the tractor for lifting either or both of the implements, and means supplementing the normal action of gravity on one of the implements to resist the power lift action when such implement is being raised independently of the other implement, and means for dividing such supplemental resistance and applying it against the lift actions to both implements when they are being raised together.

12. In a power lift mechanism for a pair of vertically movable implement members, a pair of arms disposed adjacent each other and connected to the members to respectively lift the same, power means connected to the arms for selectively or simultaneously actuating the same, and means, other than gravity, for resisting movement of an arm when selectively actuated.

13. In a power lift mechanism for a pair of vertically movable implement members, a pair of arms disposed adjacent each other and connected to the members to respectively lift the same, power means connected to the arms for selectively or simultaneously actuating the same, and means, other than gravity, for resisting movement of an arm when selectively actuated, said resisting means also influencing both arms when the other of said arms has been moved to a degree corresponding in lift action to that of the first actuated arm.

WILLIAM E. KNAPP.
PAUL C. SEAHOLM.